| (12) | United States Patent<br>Chang et al. | (10) Patent No.: US 10,288,992 B2<br>(45) Date of Patent: May 14, 2019 |
|---|---|---|

(54) LASER LIGHT SOURCE FOR PROJECTOR AND LASER PROJECTION DEVICE

(71) Applicant: DELTA ELECTRONICS, INC., Taoyuan (TW)

(72) Inventors: Keh-Su Chang, Taoyuan (TW); Chun-Hsien Lu, Taoyuan (TW); Yen-I Chou, Taoyuan (TW); Chi Chen, Taoyuan (TW); Po-Tsun Kuo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/854,726

(22) Filed: Dec. 26, 2017

(65) Prior Publication Data

US 2018/0231879 A1  Aug. 16, 2018

Related U.S. Application Data

(60) Provisional application No. 62/459,617, filed on Feb. 16, 2017.

(30) Foreign Application Priority Data

Aug. 4, 2017 (TW) .............................. 106126325 A

(51) Int. Cl.
*G03B 21/20* (2006.01)
*H04N 9/31* (2006.01)
(Continued)

(52) U.S. Cl.
CPC ......... *G03B 21/204* (2013.01); *G03B 21/208* (2013.01); *G03B 21/2013* (2013.01);
(Continued)

(58) Field of Classification Search
CPC .............. G03B 21/204; G03B 21/2033; G03B 21/2013; H04N 9/3158; H04N 9/3161; H04N 9/3164
See application file for complete search history.

(56) References Cited

U.S. PATENT DOCUMENTS

2006/0087847 A1*  4/2006  Yamanaka ........... H04N 9/3114
                                                     362/277
2010/0328632 A1  12/2010  Kurosaki et al.
(Continued)

FOREIGN PATENT DOCUMENTS

| CN | 103424837 B | 11/2015 |
| EP | 2530520 A1 | 12/2012 |
| TW | I544179 B | 8/2016 |
| TW | I548927 B | 9/2016 |

OTHER PUBLICATIONS

Larry J. Hornbeck, "Digital Light Processing for high-brightness high-resolution applications", Proceeding SPIE, 3013, Projection Displays III, May 8, 1997, http://dx.doi.org/10.1117/12.273880.
"DLP™ System Optics," Texas Instrument, Jul. 2010.

*Primary Examiner* — Ryan D Howard
(74) *Attorney, Agent, or Firm* — CKC & Partners Co., LLC

(57) ABSTRACT

A laser light source for projector includes a laser light source module, first and second light receiving modules, a phosphor wheel, and a light combining module. The phosphor wheel has a first and a second side. The phosphor wheel receives the laser and converts the laser into first and second fluorescent light. The phosphor wheel receives the laser at a first side and emits the first fluorescent light. The phosphor wheel emits the second fluorescent light at a second side. After the first fluorescent light and the second fluorescent light passes through the first and second light receiving modules, at least one of the directions of optical axes of the first and second (Continued)

fluorescent light is changed. The light combining module receives the first and second fluorescent lights and emits a combined light.

19 Claims, 11 Drawing Sheets

(51) Int. Cl.
*G03B 33/08* (2006.01)
*G03B 33/12* (2006.01)
*G03B 33/06* (2006.01)

(52) U.S. Cl.
CPC ..... *G03B 21/2033* (2013.01); *G03B 21/2066* (2013.01); *G03B 33/06* (2013.01); *G03B 33/08* (2013.01); *G03B 33/12* (2013.01); *H04N 9/3158* (2013.01)

(56) References Cited

U.S. PATENT DOCUMENTS

| | | | |
|---|---|---|---|
| 2012/0268503 A1* | 10/2012 | Sugiyama | H04N 9/3161 345/690 |
| 2013/0242534 A1* | 9/2013 | Pettitt | G03B 21/204 362/84 |
| 2014/0204558 A1 | 7/2014 | Bartlett | |
| 2014/0253882 A1 | 9/2014 | King et al. | |
| 2014/0362349 A1* | 12/2014 | Chiu | G03B 21/204 353/31 |
| 2015/0049307 A1 | 2/2015 | Kashihara | |

\* cited by examiner

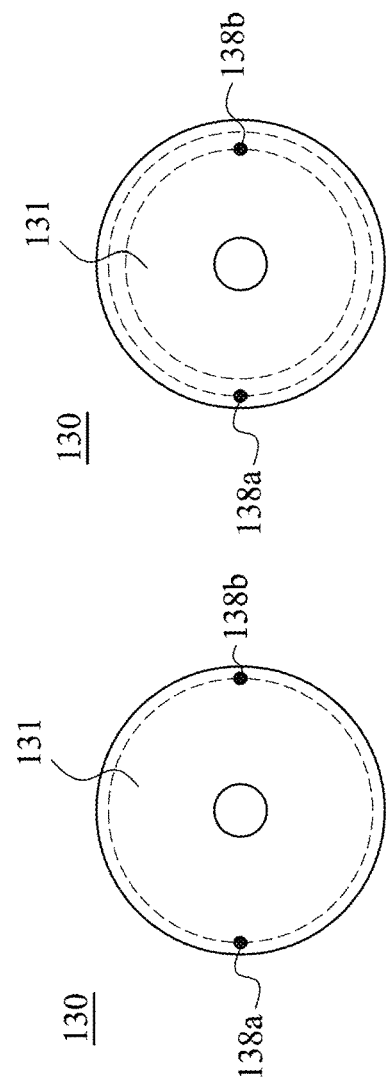
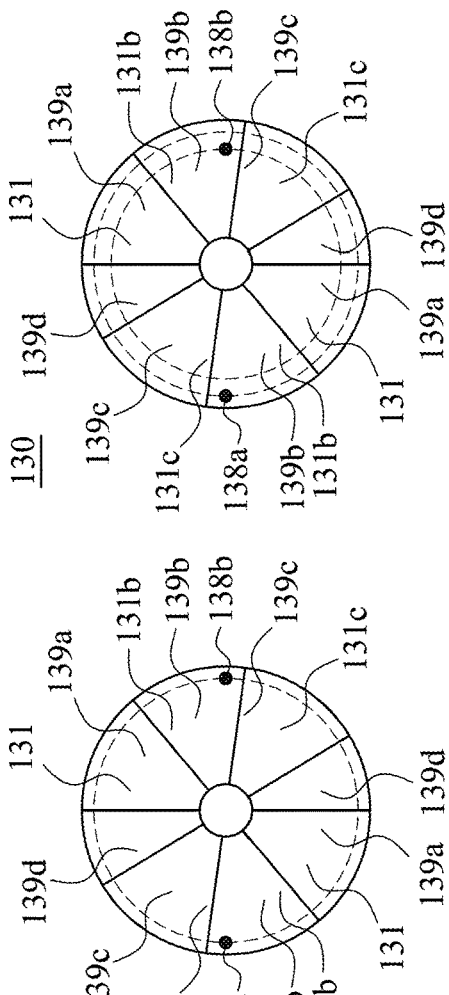

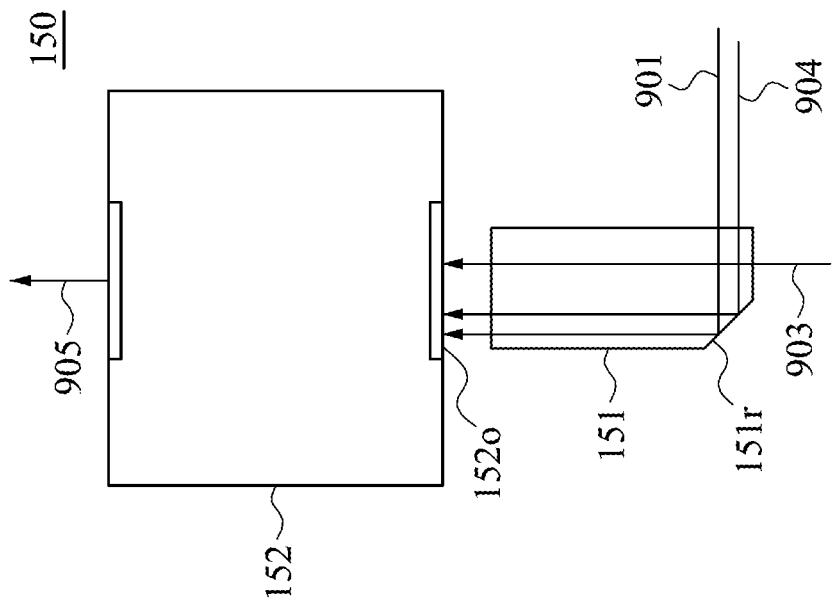
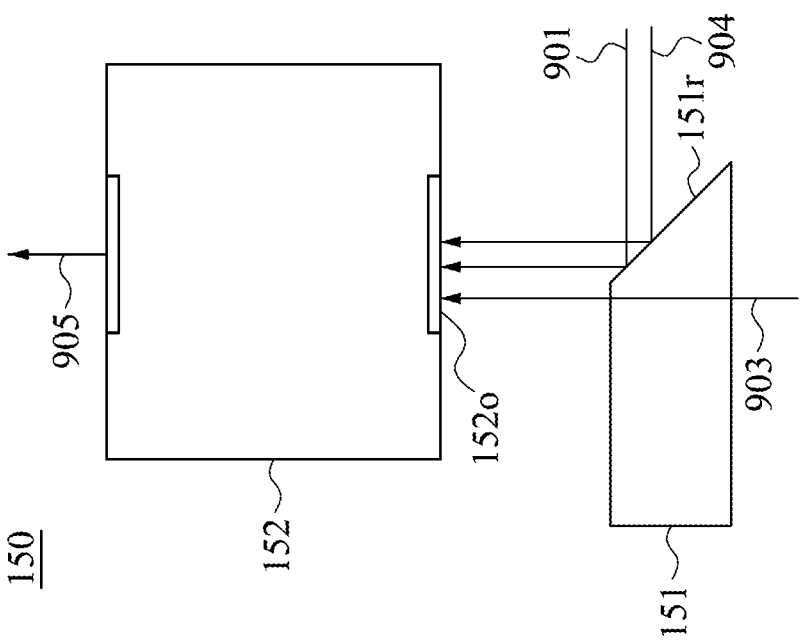

LASER LIGHT SOURCE FOR PROJECTOR AND LASER PROJECTION DEVICE

RELATED APPLICATIONS

This application claims priority to U.S. Provisional Application Ser. No. 62/459,617, filed Feb. 16, 2017 and Taiwan Application Serial Number 106126325, filed Aug. 4, 2017, which are herein incorporated by reference.

BACKGROUND

Field of Invention

The present disclosure relates to a laser light source for projector and a laser projection device.

Description of Related Art

With the developments of laser light source, the size of the laser light source is getting smaller, while the power and brightness are getting better, so that projector uses laser light as the light source is getting more and more common.

In order to further improve the characteristics of laser light source for projector, the relevant areas try hard work to development. To provide a laser light source for projector with better characteristics thus has become one of the important issues and a goal to achieve in current related fields.

SUMMARY

One aspect of the present disclosure is to provide a laser light source for projector, to improve the brightness of the emitted combined light.

According to an exemplary embodiment of the present disclosure, a laser light source for projector includes at least a first laser light source module, a first light receiving module, a phosphor wheel, a second light receiving module and a light combining module. The first laser light source module emits the first laser light. The first laser light passes through the first light receiving module. The phosphor wheel has a first side and a second side. The phosphor wheel receives the first laser light and converts the first laser light into the first fluorescent light and the second fluorescent light. The first side receives the first laser light which passes through the first light receiving module and emits the first fluorescent light. The second side emits the second fluorescent light. After the first fluorescent light passes through the first light receiving module and the second fluorescent light passes through the second light receiving module, at least one of the direction of optical axes of the first fluorescent light and the second fluorescent light is changed, and, a total number of times by which the directions of the optical axes of the first fluorescent light and the second fluorescent light changes is at least twice. The light combining module receives the first fluorescent light which passes through the first light receiving module and the second fluorescent light which passes through the second light receiving module, and combines the first fluorescent light and the second fluorescent light to form a combined light.

In one or more exemplary embodiments of the present disclosure, the first laser light is blue light.

In one or more exemplary embodiments of the present disclosure, the first fluorescent light and the second fluorescent light have the same spectrum.

In one or more exemplary embodiments of the present disclosure, the brightness difference between the first fluorescent light and the second fluorescent light is less than 5%.

In one or more exemplary embodiments of the present disclosure, wherein the first fluorescent light and the second fluorescent light are red lights, green lights, yellow lights, or combinations thereof.

In one or more exemplary embodiments of the present disclosure, wherein the first light receiving module includes at least a dichroic mirror. The dichroic mirror makes the laser light pass through the dichroic mirror and reflects the first fluorescent light.

In one or more exemplary embodiments of the present disclosure, wherein the first light receiving module includes at least a converging module. The converging module converges into the first fluorescent light.

In one or more exemplary embodiments of the present disclosure, wherein the second light receiving module includes at least a reflecting mirror. The reflecting mirror reflects the second fluorescent light.

In one or more exemplary embodiments of the present disclosure, the second light receiving module includes at least a converging module, and the converging module converges into the second fluorescent light.

In one or more exemplary embodiments of the present disclosure, the light combining module includes an integration rod and an optical path adjusting module. The integration rod has an opening and emits the combined light. The optical path adjusting module makes the direction of the optic axis of the first fluorescent light be the same as that of the optic axis of the second fluorescent light after the first fluorescent light and the second fluorescent light pass through the optical path adjusting module, and makes the first fluorescent light and the second fluorescent light enter the opening.

In one or more exemplary embodiments of the present disclosure, the laser light source for projector further includes a second light source module. The second light source module emits the second laser light, wherein the second laser light enters the light combining module.

In one or more exemplary embodiments of the present disclosure, the first laser light passes through the phosphor wheel, to make the first laser light leave the second side and enter the second light receiving module, the second light receiving module changes the direction of the optical axis of the first laser light, and makes the first laser light enter the light combining module after leaving the second light receiving module.

In one or more exemplary embodiments of the present disclosure, the phosphor wheel includes at least a first phosphor layer, and the first phosphor layer converts the first laser light into the first fluorescent light and the second fluorescent light.

In one or more exemplary embodiments of the present disclosure, wherein the phosphor wheel further includes at least a transparent substrate, and the first phosphor layer is disposed on the transparent substrate.

In one or more exemplary embodiments of the present disclosure, wherein the phosphor wheel further includes at least a first portion, and the phosphor layer is disposed in the first portion.

In one or more exemplary embodiments of the present disclosure, wherein the phosphor wheel further includes at least a second portion, the second portion is transparent, and the first portion and the second portion receives the first laser light at different timings.

In one or more exemplary embodiments of the present disclosure, the phosphor wheel further includes a third portion, and the phosphor wheel further includes at least a second phosphor layer, the second phosphor layer is disposed in the third portion, wherein the first portion and the third portion receives the first laser light at different timings. The first phosphor layer and the second phosphor layer converts the first laser light at different timings, for making the lights emitted from the first phosphor layer and the second phosphor layer be combined to form the first fluorescent light and the second fluorescent light.

In one or more exemplary embodiments of the present disclosure, a laser projection device includes the aforementioned laser light source for projector, a wavelength selector, at least an image module and a projection module. The wavelength selector receives the combined light, and emits a first color light, a second color light and a third color light. The image module receives the first color light, the second color light and the third color light and generates at least an image light. The projection module receives the image light, and generates at least a projection light.

In one or more exemplary embodiments of the present disclosure, an amount of the image modules is three, and the image modules respectively receives the first color light, the second color light and the third color light and generates a first color image light, a second color image light and a third color image light, respectively, and the first color image light, the second color image light and the third color image light are combined to form the image light.

In one or more exemplary embodiments of the present disclosure, an amount of the image module is one, and the wavelength selector emits the first color light, the second color light and the third color light at different timings, the image module receives the first color light, the second color light and the third color light at different timings, and generates the image lights at different timings, the projection module receives the image lights at different timings, and generates the projection lights at different timings.

The aforementioned exemplary embodiments of the present disclosure omits the design of the reflection layer by using the phosphor wheel of the laser light source for projector, to make a portion of the fluorescent light emit from the first side of the phosphor wheel, and another portion of the fluorescent light emit from the second side of the phosphor wheel, hence the fluorescent light can emit from both sides of the phosphor wheel. Therefore, since there is no reflection layer, a portion of the fluorescent light may no longer be absorbed by the reflection layer, and the fluorescent light received by the light combining module may increase accordingly, to improve the brightness of the combined light emitted from the laser light source for projector.

Moreover, after the fluorescent light is emitted by the phosphor powder to the surroundings, the fluorescent light may be absorbed by other phosphor powders, to make the fluorescent light be absorbed by itself, so that the light extracting rate (e.g. the light output ratio) of the phosphor wheel decreases. Since the phosphor wheel of the laser light source for projector omits the design of the reflection layer, the fluorescent light may leave the phosphor layer directly after the fluorescent light reaches the first side or the second side of the phosphor wheel. Thus, an average path length of the fluorescent light in the phosphor layer may be shorter, so that the phosphor layer may less prone to make the fluorescent light self-absorption, and thereby effectively enhancing the luminous efficiency of the phosphor layer.

By the two aforementioned mechanisms, the brightness of the combined light emitted from the laser light source for projector can be greatly improved. In some exemplary embodiments, comparing to conventional laser light source for projector, the brightness of the combined light emitted from the laser light source for projector can be increased about 20% to 30%.

BRIEF DESCRIPTION OF THE DRAWINGS

FIG. 10 to FIG. 15 are front views of a phosphor wheel according to different exemplary embodiments of the present disclosure;

FIG. 18 and FIG. 19 are diagrams illustrating a light combining module according to different exemplary embodiments of the present disclosure;

DETAILED DESCRIPTION

Figure 1:
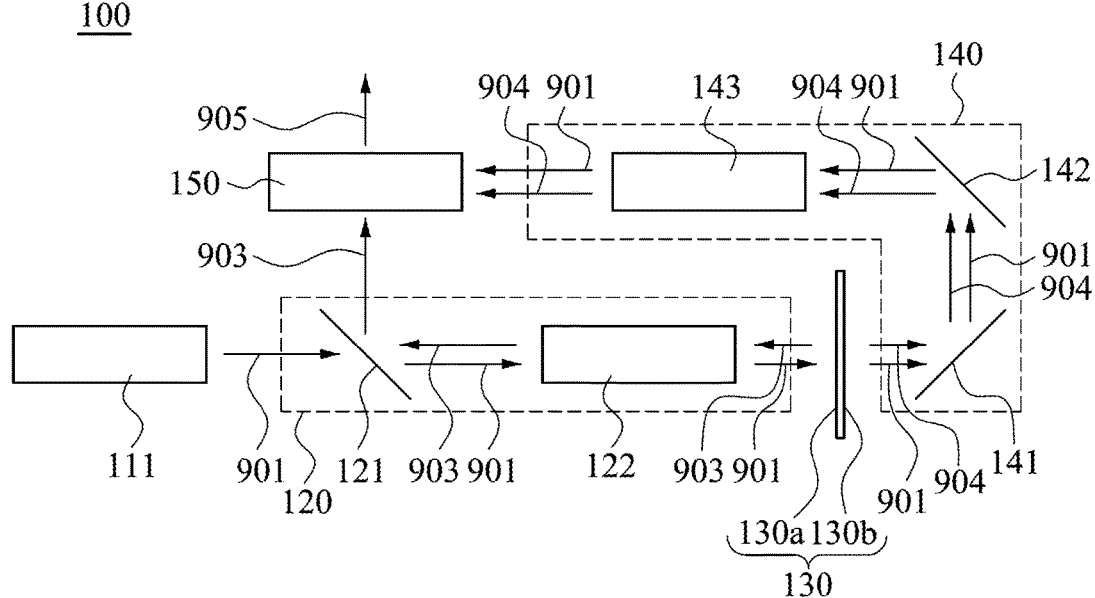
FIG. 1 is a diagram illustrating a laser light source for projector and corresponding optical paths according to an exemplary embodiment of the present disclosure.

FIG. 1 is a diagram illustrating a laser light source for projector 100 and corresponding optical paths according to an exemplary embodiment of the present disclosure. Several exemplary embodiments of the present disclosure provide a laser light source for projector 100. As shown in FIG. 1, a laser light source for projector 100 includes a laser light source module 111, a light receiving module 120, a phosphor wheel 130, a light receiving module 140 and a light combining module 150.

The laser light source module 111 emits a laser light 901. The laser light 901 passes through the light receiving module 120. The phosphor wheel 130 has a first side 130a and a second side 130b. The phosphor wheel 130 receives the laser light 901, and converts a portion of the laser light 901 into a fluorescent light 903 and a fluorescent light 904. The first side 130a receives the laser light 901 which passes through the light receiving module 120 and emits the fluorescent light 903. The second side 130b emits the fluorescent light 904 and the laser light 901 passes through the phosphor wheel 130. The fluorescent light 903 has a first optical axis, and the fluorescent light 903 can be turned in the light receiving module 120, if it is turned once, after the fluorescent light 903 passes through the light receiving module 120, the direction of the first optical axis is changed by the light receiving module 120. The light receiving module 140 receives the fluorescent light 904, wherein the fluorescent light 904 has a second optical axis, and the fluorescent light 904 can be turned in the light receiving module 140, if it is turned twice, after the fluorescent light 904 passes the light receiving module 140, the direction of the second optical axis is changed by the light receiving module 140. The light combining module 150 receives the fluorescent light 903 which passes through the light receiving module 120 and the fluorescent light 904 which passes through the light receiving module 140, and combines the fluorescent light 903 and the fluorescent light 904 to form the combined light 905, wherein when the fluorescent lights 903 and 904 enter the light combining module 150, an angular difference between the first optical axis and the second optical axis is larger than 30°. In this exemplary embodiment, an angular difference between the first optical axis and the second optical axis is about 90°.

Moreover, the laser light 901 passes through the phosphor wheel 130, to make the laser light 901 leave the second side 130b of the phosphor wheel 130 and enter the light receiving module 140, the laser light 901 has a third optical axis, and the laser light 901 can be turned in the light receiving module 140, if it is turned twice, the light receiving module 140 may change the direction of the third optical axis and make the laser light 901 enter the light combining module 150 after leaving the light receiving module 140.

Figure 2:
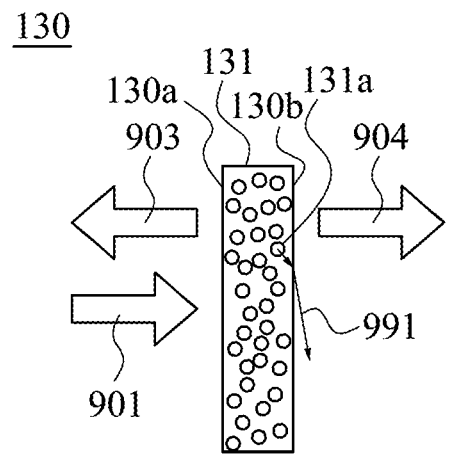
FIG. 2 is a side view of a portion of a phosphor wheel according to an exemplary embodiment of the present disclosure.

FIG. 2 is a side view of a portion of the phosphor wheel 130 according to an exemplary embodiment of the present disclosure. As shown in FIG. 2, the phosphor wheel 130 includes a phosphor layer 131, and the phosphor layer 131 converts the laser light 901 into the fluorescent light 903 and the fluorescent light 904.

Figure 3:
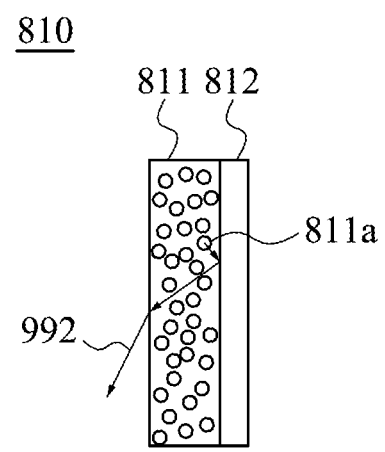
FIG. 3 is a side view of a portion of a phosphor wheel of a conventional laser light source for projector.

FIG. 3 is a side view of a portion of a phosphor wheel 810 of a conventional laser light source for projector. As shown in FIG. 1, FIG. 2 and FIG. 3, in a conventional laser light source for projector, the phosphor wheel can be a transmissive phosphor wheel or a reflective phosphor wheel, for instance, the phosphor wheel 810 is a reflective phosphor wheel. The phosphor wheel 810 collects the fluorescent light emitted from the phosphor layer 811 by its reflective layer 812, for making the fluorescent light 992 emit from one side of the phosphor wheel 810. Since the laser light enters the phosphor layer 811 and excites the phosphor powder 811a in the phosphor layer 811, the fluorescent light 992 may hence be emitted by the phosphor powder 811a around itself as a starting point, making the fluorescent light 992 enter the reflective layer 812 at different incident angles. When an incident angle at which the fluorescent light 992 enters the reflective layer 812 is greater than a certain angle, such as 60°, the reflectivity of the reflective layer 812 may decrease to a certain extent. In other words, the reflective layer 812 may absorb a portion of the fluorescent light 992. To avoid a similar situation, the phosphor wheel 130 of the laser light source for projector 100 omits the usage of the reflective layer, to make the fluorescent light 903 emit from the first side 130a of the phosphor wheel 130, and the fluorescent light 904 emit from the second side 130b of the phosphor wheel 130. Therefore, since there is no reflective layer, the situation that the reflective layer absorbs a portion of the fluorescent lights 903 and 904 may not happen, making the light combining module 150 receive more fluorescent lights 903 and 904, which may greatly promote the brightness of the combined light 905 emitted by the laser light source for projector 100.

Furthermore, as shown in FIG. 2 and FIG. 3, after the phosphor powders 131a and 811a emit the fluorescent lights 991 and 992 from itself to the surroundings, the fluorescent lights 991 and 992 may be absorbed by other phosphor powders, making the fluorescent light self-absorption, and this part may be the loss of energy, and leading to the decrease of light extracting rate (e.g. the light output ratio) of the phosphor wheels 130 and 810. In a conventional laser light source for projector, the fluorescent light 992 may pass through a portion of the phosphor layer 811, and then be reflected by the reflective layer 812, and then turn back to the phosphor layer 811. In contrast, since the phosphor wheel 130 of the laser light source for projector 100 omits the usage of the reflective layer, after the fluorescent light 991 reaches the first side 130a or the second side 130b, the fluorescent light may leave the phosphor layer 131 directly. Thus, assuming the phosphor layers with the same thickness, comparing to the average path length of the fluorescent light 992 in the phosphor layer 811, the average path length of the fluorescent light 991 in the phosphor layer 131 may be relatively shorter. Therefore, comparing to the conventional laser light source for projector, it is less likely for the fluorescent light of the phosphor layer 131 to have self-absorption, leading to a better control of luminous efficiency of the phosphor layer 131.

By the aforementioned mechanism, the brightness of the combined light 905 emitted by the laser light source for projector 100 may be greatly increased. In some exemplary embodiments, comparing to the conventional laser light source for projector, the brightness of the combined light 905 emitted by the laser light source for projector 100 may be increased about 20% to 30%. However, for the whole laser light source for projector 100, after the fluorescent lights 903 and 904 pass through the light receiving modules 120 and 140, it is not necessary to form the combined light by the light combining module 150, that is, it is allowed to be separated into two optical paths and then be processed by the corresponding back-end wavelength selector 210 and image module 220, to achieve the efficacy of the present disclosure.

The laser light 901 is an excitation light for exciting the phosphor layer 131, preferably, it is a laser light with a shorter wavelength and then is converted by the phosphor powder 131a to change into an excitation light with a longer wavelength. For example, the laser light 901 is a blue light or an ultraviolet light, and the fluorescent lights 903 and 904 are the aforementioned excitation lights. It is to be understood that the embodiments of the laser light 901 described above are merely illustrative and are not intended to limit the scope of the invention, and people with ordinary skills in this art can flexibly choose the implementation method of the laser light 901 depending on the actual requirements.

For example, the fluorescent light 903 and the fluorescent light 904 have the same spectrum, and a brightness difference of the fluorescent light 903 and the fluorescent light 904 is less than 5%. The fluorescent light 903 and the fluorescent light 904 are red lights, green lights, yellow lights or combinations thereof. It is to be understood that the embodiments of the fluorescent light 903 and the fluorescent light 904 described above are merely illustrative and are not intended to limit the scope of the invention, and people with ordinary skills in this art can flexibly choose the implementation method of the fluorescent light 903 and the fluorescent light 904 depending on the actual requirements.

As shown in FIG. 2, the phosphor layer 131 is a glass block in which the phosphor powder 131a is sintered, but it is not intended to limit the scope of the invention. In other exemplary embodiments, the phosphor layer 131 can be other light-transmitting materials.

Figure 4:
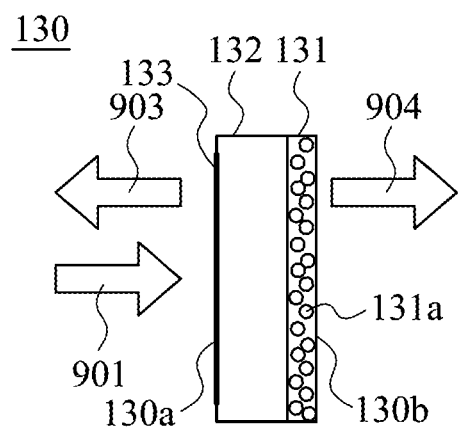
FIG. 4 to FIG. 9 are side views of a portion of a phosphor wheel according to different exemplary embodiments of the present disclosure.

FIG. 4 to FIG. 9 are side views of a portion of the phosphor wheel 130 according to different exemplary embodiments of the present disclosure. As shown in FIG. 4, the phosphor wheel 130 in this exemplary embodiment is about the same as the phosphor wheel 130 in FIG. 2, the mainly differences may be described in the following.

The phosphor wheel 130 further includes a transparent substrate 132. The phosphor layer 131 is disposed on the transparent substrate 132. For example, the transparent substrate 132 is located in the first side 130a and the phosphor layer 131 is located in the second side 130b. Moreover, the phosphor wheel 130 further includes an antireflection film 133. The antireflection film 133 is disposed at a side of the transparent substrate 132 opposite to the phosphor layer 131, that is, at the light incident side where the laser light 901 enters the phosphor wheel 130, for promoting the light transmission capability of the transparent substrate 132.

For example, the phosphor layer 131 is a transparent colloid in which the phosphor powder 131a is mixed, but it is not a limitation of the present disclosure. In other embodiments, the phosphor layer 131 can be other light transmitting materials.

For example, the material of the transparent substrate 132 can be glass; however, it is not a limitation. In other exemplary embodiments, the transparent substrate 132 can be other transparent materials.

Figure 5:
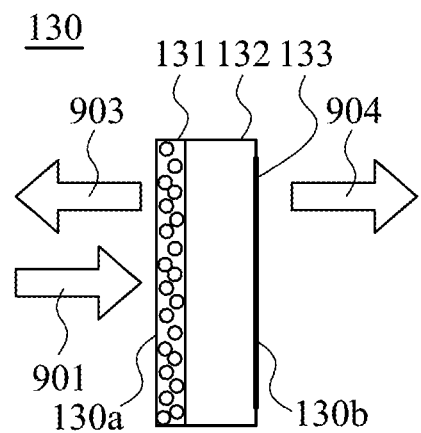

As shown in FIG. 5, the phosphor wheel 130 in this exemplary embodiment is approximately the same as the phosphor wheel 130 in FIG. 4. The mainly difference is that, the phosphor layer 131 is located at the first side 130a, and the transparent substrate 132 is located at the second side 130b. Further, the antireflection film 133 is disposed on a side of the transparent substrate 132 opposite to the phosphor layer 131, that is, at the light extraction side of the fluorescent light 904, for promoting the light extracting efficiency of the phosphor wheel 130.

Figure 6:
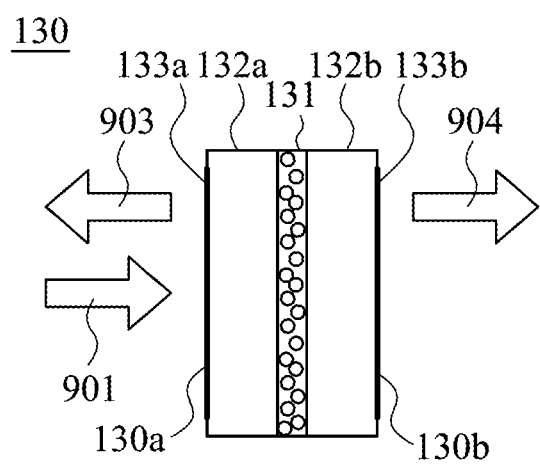

As shown in FIG. 6, the phosphor wheel 130 in this exemplary embodiment is approximately the same as the phosphor wheel 130 in FIG. 2; the mainly differences are described in the following.

The phosphor wheel 130 further includes two transparent substrates 132a and 132b. The phosphor layer 131 is placed between the transparent substrate 132a and the transparent substrate 132b. For example, the transparent substrate 132a is located at the first side 130a, and the transparent substrate 132b is located at the second side 130b. Furthermore, the phosphor wheel 130 further includes antireflection films 133a and 133b. The antireflection film 133a is disposed at a side of the transparent substrate 132a opposite to the phosphor layer 131, and the antireflection film 133b is disposed at a side of the transparent substrate 132b opposite to the phosphor layer 131.

Figure 7:
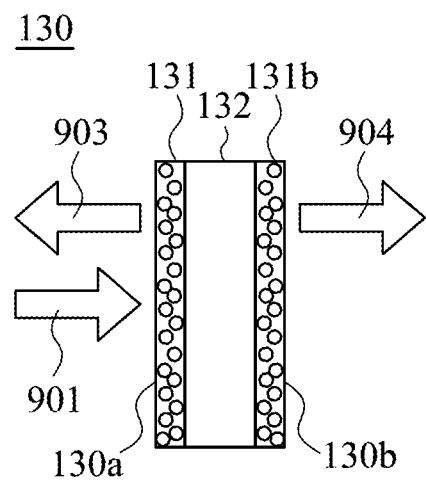

As shown in FIG. 7, the phosphor wheel 130 in this exemplary embodiment is approximately the same as the phosphor wheel 130 in FIG. 5. The mainly differences are described in the following.

The phosphor wheel 130 further includes a phosphor layer 131b. The phosphor layer 131 and the phosphor layer 131b are disposed on the two sides of the transparent substrate 132, respectively. For example, the phosphor layer 131 is located at the first side 130a and the phosphor layer 131b is located at the second side 130b. In addition, the phosphor wheel 130 does not include an antireflection film 133. In other embodiments, the phosphor layer 131 and the phosphor layer 131b can be the same or different fluorescent materials, to make the spectrums of the fluorescent light 903 and the fluorescent light 904 be the same or different, so that the back-end combined light 905 can be adjusted to have desired optical properties such as wavelength range or intensity.

Figure 8:
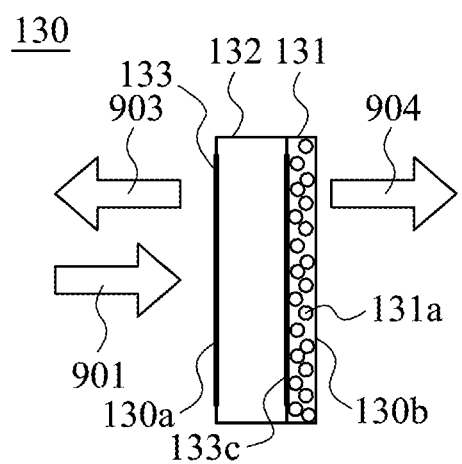

As shown in FIG. 8, the phosphor wheel 130 in this exemplary embodiment is approximately the same as the phosphor wheel 130 in FIG. 4. The mainly difference is that the antireflection film 133c can be formed to be disposed between the phosphor layer 131 and the transparent substrate 132 by coating or other manners, wherein the optical properties of the antireflection film 133c match the optical properties of the phosphor layer 131 and the transparent substrate 132, so that the antireflection requirements between the phosphor layer 131 and the transparent substrate 132 can be processed.

Figure 9:
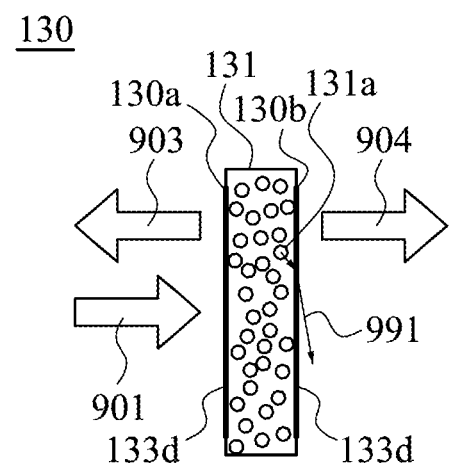

As shown in FIG. 9, the phosphor layer 131 in this exemplary embodiment is approximately the same as the phosphor layer 131 in FIG. 2. The mainly difference is that the antireflection film 133d can be formed to be disposed at two sides of the phosphor layer 131 by coating or other manners, wherein the optical properties of the antireflection film 133d match the optical properties of the phosphor layer 131 and the air, so that the light extraction capability of the phosphor layer 131 is promoted.

Similar to FIG. 8 and FIG. 9, the phosphor wheels 130 in FIG. 5 to FIG. 7 also dispose additional antireflection film 133c or antireflection film 133d at two sides of the phosphor layer or between the phosphor layer and the transparent substrate.

FIG. 10 to FIG. 15 are front views of the phosphor wheel 130 according to different exemplary embodiments of the present disclosure. As shown in FIG. 10, the phosphor layer 131 is full of the phosphor wheel 130. Further, the position where the laser light 901 (as shown in FIG. 1) enters the phosphor wheel 130 is a dot 138a, and the dotted line is the path of the laser light 901 irradiated on the phosphor wheel 130 when the phosphor wheel 130 rotates. In other variation of the exemplary embodiment, the phosphor layer 131 is not necessary to be full of the whole phosphor wheel 130, that is, it is allowed to be a ring-shaped distribution on the aforementioned path, to achieve the object of the present disclosure.

As shown in FIG. 11, the phosphor wheel 130 in this exemplary embodiment is approximately the same as the phosphor wheel 130 in FIG. 10; the mainly differences are described in the following.

An amount of the laser light source module 111 (as shown in FIG. 1) is greater than one. Therefore, an amount of the laser light 901 (as shown in FIG. 1) may also be greater than one. The position where one of the laser light 901 enters the phosphor wheel 130 is the dot 138a, and the position where the other laser light 901 enters the phosphor wheel 130 is the dot 138b. A distance between the dot 138a and the center of the phosphor wheel 130 is the same as a distance between the dot 138b and the center of the phosphor wheel 130. It is noted that in some other exemplary embodiments, the energy or the spectrums of the two laser lights 901 enter the phosphor wheel 130 can be different, or the two laser lights 901 can emit light at different timings. In addition, the positions where the laser light 901 enters the phosphor wheel 130 can be more than the dots 138a and 138b, and the distances between different positions where the laser light 901 enters the phosphor wheel 130 and the center of the phosphor wheel 130 can be the same or different.

Furthermore, the dots 138a and 138b are disposed at the right side and the left side of the phosphor wheel 130, respectively. Therefore, when the laser light source for projector 100 is in operations and the phosphor wheel 130 is rotating, the portions of the phosphor layer 131 passing through the dots 138a and 138b may pass through the dots 138a and 138b again after the phosphor wheel 130 turns half circle, so that a time interval that each portion of the phosphor layer 131 passes through the dots 138a and 138b can be extended, to avoid each portion of the phosphor layer 131 being burned by the laser light 901. In similar applications, the laser light source module 111 emits light to the dots 138a and 138b at different times in regular interval. It is noted that the aforementioned positions of the dots 138a and 138b are for illustrative purpose only, and are not intended to limit the present disclosure. People with ordinary skills in this art can flexibly choose the positions of the dots 138a and 138b depending on the actual requirements.

As shown in FIG. 12, the phosphor wheel 130 in this exemplary embodiment is approximately the same as the phosphor wheel 130 in FIG. 11. The mainly differences are described in the following.

A distance between the dot 138a and the center of the phosphor wheel 130 is greater than a distance between the dot 138b and the center of the phosphor wheel 130. Since the distance between the dot 138a and the center of the phosphor wheel 130 is different from the distance between the dot 138b and the center of the phosphor wheel 130, the portion of the phosphor layer 131 which passes through the dot 138a may not pass through the dot 138b, and the portion of the phosphor layer 131 which passes through the dot 138b may not pass through the dot 138a. Therefore, a time interval that each portion of the phosphor layer 131 passes through the dots 138a and 138b can be further extended, avoiding each portion of the phosphor layer 131 being burned by the laser light 901.

The phosphor wheel 130 in FIG. 13 to FIG. 15 is approximately the same as the phosphor wheel 130 in FIG. 10 to FIG. 12. The mainly difference is that, the phosphor wheel 130 has different portions, wherein different portions can be with different phosphor layers or without phosphor layers.

As shown in FIG. 13, the phosphor wheel 130 in this exemplary embodiment is approximately the same as the phosphor wheel 130 in FIG. 10. The mainly differences are described in the following.

Base on the center of the phosphor wheel 130, the phosphor wheel 130 can be cut into portions 139a, 139b, 139c and 139d by sector. The phosphor layer 131 is disposed on the portion 139a. The phosphor wheel 130 further includes phosphor layers 131b and 131c. The phosphor layer 131b is disposed on the portion 139b, and the phosphor layer 131c is disposed on the portion 139c. The portion 139d is transparent. When the laser light source module 111 continues to emit the laser light 901 (as shown in FIG. 1) and the phosphor wheel 130 is rotating, the portions 139a, 139b, 139c and 139d may receive the laser light 901 at different timings. Thus, the phosphor layers 131, 131b and 131c convert the laser light 901 at different timings, and the phosphor layers 131, 131b and 131c may emit different or the same fluorescent lights, respectively, and the fluorescent lights may be combined to form the fluorescent light 903 and the fluorescent light 904. When the portion 139d receives the laser light 901, the laser light 901 may penetrate the portion 139d of the phosphor wheel 130.

For example, the fluorescent lights emitted by the phosphor layers 131, 131b and 131c can be red, green, yellow, or combinations thereof. Moreover, two or three of the fluorescent lights emitted by the phosphor layers 131 and 131b and 131c can be red lights with two or three different spectrums, green lights with two or three different spectrums, or yellow lights with two or three different spectrums. Thus, the fluorescent light 903 and the fluorescent light 904 can be combined at the back end, to be adjusted to having desired spectrums.

As shown in FIG. 14, the phosphor wheel 130 in this exemplary embodiment is approximately the same as the phosphor wheel 130 in FIG. 11. The mainly differences are described in the following.

Base on the center of the phosphor wheel 130, the phosphor wheel 130 can be cut into two portions 139a, two portions 139b, two portions 139c and two portions 139d by sector. The phosphor layers 131 are disposed on the portions 139a. The phosphor layers 131b are disposed on the portions 139b, and the phosphor layers 131c are disposed on the portions 139c. The portions 139d are transparent. The portions 139a, 139b, 139c and 139d receive the laser light 901 (as shown in FIG. 1) at different timings. Thus, the phosphor layers 131, 131b and 131c convert the laser light 901 at different timings, and the phosphor layers 131, 131b and 131c may emit different or the same fluorescent lights, respectively, and, the fluorescent lights may be combined to form the fluorescent light 903 and the fluorescent light 904. When the portions 139d receives the laser light 901, the laser light 901 may penetrate the portions 139d of the phosphor wheel 130.

For example, the fluorescent lights emitted by the phosphor layers 131, 131b and 131c can be red, green, yellow, or combinations thereof. Moreover, two or three of the fluorescent lights emitted by the phosphor layers 131 and 131b and 131c can be red lights with two or three different spectrums, green lights with two or three different spectrums, or yellow lights with two or three different spectrums.

As shown in FIG. 15, the phosphor wheel 130 in this exemplary embodiment is approximately the same as the phosphor wheel 130 in FIG. 14. The mainly differences are described in the following.

A distance between the dot 138a and the center of the phosphor wheel 130 is greater than a distance between the dot 138b and the center of the phosphor wheel 130. Since the distance between the dot 138a and the center of the phosphor wheel 130 is different from the distance between the dot 138b and the center of the phosphor wheel 130, the portion of the phosphor layer 131 which passes through the dot 138a may not pass through the dot 138b, and the portion of the phosphor layer 131 which passes through the dot 138b may not pass through the 138a.

It is noted that the aforementioned positional arrangements of different portions of the phosphor wheel 130 are merely illustrative. For instance, in some exemplary embodiments, the portion 139a can further be divided into two parts, one part of the portion 139a which is closer to the center of the phosphor wheel 130, and the other part of the portion 139a which is further away from the center of the phosphor wheel 130. Thus, the part of the portion 139a which is closer to the center of the phosphor wheel 130 may pass through the dot 138b but it may not pass through the dot 138a, and the other part of the portion 139a which is further away from the center of the phosphor wheel 130 may pass through the dot 138a but it may not pass through the dot 138b. The portion 139a can also be divided into three or more parts based on the distance between the portion 139a and the center of the phosphor wheel 130. The portions 139b, 139c and 139d can also be divided into a plurality of parts.

Figure 17:
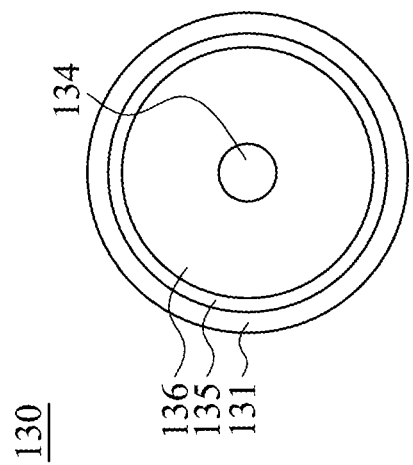
FIG. 16 and FIG. 17 are front views of a phosphor wheel according to different exemplary embodiments of the present disclosure.
Figure 16:
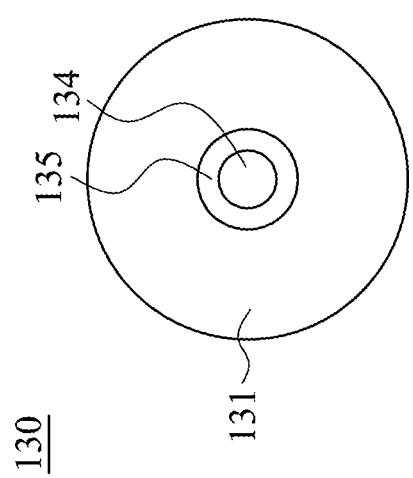

FIG. 16 and FIG. 17 are front views of the phosphor wheel 130 according to different exemplary embodiments of the present disclosure. As shown in FIG. 16, the phosphor wheel 130 further includes a motor 134 and an upper collar 135. The motor 134 is disposed on the center of the phosphor wheel 130, and the phosphor layer 131 surrounds the motor 134. The upper collar 135 is disposed between the motor 134 and the phosphor layer 131, thereby fixing the motor 134 on the phosphor layer 131. More materials can be added on the upper collar 135, or some materials on the upper collar 135 can be removed, for adjusting the rotational balance of the phosphor wheel 130.

As shown in FIG. 17, the phosphor wheel 130 further includes a motor 134, an upper collar 135 and a rigid plate 136. The motor 134 is fixed on the rigid plate 136, and the phosphor layer 131 surrounds the rigid plate 136. The upper collar 135 is disposed between the rigid plate 136 and the phosphor layer 131, making the rigid plate 136 be fixed on the phosphor layer 131.

It is noted that in some exemplary embodiments, the phosphor layer 131 can be divided into several portions, and different portions can have different phosphor layers, and some portions can be transparent.

Reference is made back to FIG. 1. The light receiving module 120 includes a dichroic mirror 121 and a converging module 122. After the laser light source module 111 emits the laser light 901, the laser light 901 may pass through the dichroic mirror 121 and the converging module 122 and then enter the phosphor wheel 130. After the first side 130a of the phosphor wheel 130 emits the fluorescent light 903, the converging module 122 converges the fluorescent light 903. Then, the dichroic mirror 121 reflects the fluorescent light 903, making the fluorescent light 903 turn at the dichroic mirror 121, thus changing the direction of the first optical axis of the fluorescent light 903. For example, an incident angle at which the fluorescent light 903 enters the dichroic mirror 121 is less than 60° to avoid the dichroic mirror 121 absorbing the fluorescent light 903. In this exemplary embodiment, the incident angle at which the fluorescent light 903 enters the dichroic mirror 121 is about 45°.

For example, the converging module 122 includes at least a converging mirror. It is noted that the fluorescent light 903 may be diverged from the phosphor powder to the surroundings, thus, an optical path length between the converging module 122 and the phosphor wheel 130 should be adjusted according to the divergent situation, for making the converging module 122 effectively converge the fluorescent light 903.

In addition, the aforementioned arrangement of the optical path of the light receiving module 120 is merely illustrative. For instance, in some exemplary embodiments, after the first side 130a of the phosphor wheel 130 emits the fluorescent light 903, the dichroic mirror 121 reflects the fluorescent light 903, and then the converging module 122 converges the fluorescent light 903 and sends the fluorescent light 903 to the light combining module 150. Further, in some exemplary embodiments, the laser light 901 may only pass through the dichroic mirror 121 and may not pass through the converging module 122.

The light receiving module 140 includes reflecting mirrors 141 and 142, and a converging module 143. After the second side 130b of the phosphor wheel 130 emits the fluorescent light 904, the reflecting mirrors 141 and 142 sequentially reflect the laser light 901 and the fluorescent light 904, and the reflecting mirrors 141 and 142 change the direction of the first optical axis of the fluorescent light 904 and the direction of the third optical axis of the laser light 901, that is, the fluorescent light 904 and the laser light 901 may be turned twice and then enter the converging module 143. Then, the converging module 143 converges the fluorescent light 904, and the laser light 901 passes through the converging module 143. For example, an incident angle at which the fluorescent light 904 enters the reflecting mirrors 141 and 142 is less than about 60° to avoid the reflecting mirrors 141 and 142 absorbing the fluorescent light 904. In this exemplary embodiment, the incident angle at which the fluorescent light 904 enters the reflecting mirrors 141 and 142 is about 45°. In other variations, the reflecting mirrors 141 and 142 can be transmissive dichroic mirrors or reflective dichroic mirrors, selectively, according to the actual requirements, corresponding to the specific wavelength ranges of the laser light 901 and the fluorescent light 904, for adjusting the optical properties of the back end combined light 905.

For example, the converging module 143 includes at least a converging mirror. It is noted that since the fluorescent light 903 is diverged from the phosphor powder to the surroundings, the optical path length between the converging module 143 and the phosphor wheel 130 should be adjusted according to the divergent situation, for making the converging module 143 effectively converge the fluorescent light 904.

In addition, the aforementioned arrangements of the optical path of the light receiving module 140 are merely illustrative. For instance, in some exemplary embodiments, after the second side 130b of the phosphor wheel 130 emits the fluorescent light 904, the converging module 143 converges the fluorescent light 904 and the laser light 901 passes through the converging module 143. Then the reflecting mirrors 141 and 142 sequentially reflect the laser light 901 and the fluorescent light 904.

FIG. 18 and FIG. 19 are side views of the light combining module 150 according to different exemplary embodiments of the present disclosure. As shown in FIG. 18, the light combining module 150 includes an optical path adjusting module 151 and an integration rod 152. The integration rod 152 has an opening 152o and emits the combined light 905 at the exit. The optical path adjusting module 151 makes the direction of the first optical axis of the fluorescent light 903, the direction of the second optical axis of the fluorescent light 904, and the direction of the third optical axis of the laser light 901 be the same, and makes the laser light 901, the fluorescent lights 903 and 904 enter the opening 152o after the laser light 901 and the fluorescent lights 903 and 904 pass through the optical path adjusting module 151. Then, after the integration rod 152 evenly mixes the laser light 901, the fluorescent lights 903 and 904 entering the opening 152o, the integration rod 152 emits the combined light 905.

For example, the optical path adjusting module 151 has a reflective surface 151r. The reflective surface 151r reflects the laser light 901 and the fluorescent light 904. An incident angle at which the laser light 901 and the fluorescent light 904 enter the reflective surface 151r is about 45°.

In other exemplary embodiments, the optical path adjusting module 151 can be other types. For instance, FIG. 19 illustrates another type of the optical path adjusting module 151. Moreover, the optical path adjusting module 151 and the integration rod 152 can be integrated, mainly making the incident plane arrange the directions of each optical path, so that the directions may be the same as the direction of the third optical axis, then evenly mixing each of the optical paths. In a further exemplary embodiment, the optical path adjusting module 151 can be an optical fiber module.

In some exemplary embodiments, the converging mirror can be used to replace the integration rod 152. In addition, the light combining module 150 can be an optical fiber module.

Figure 20:
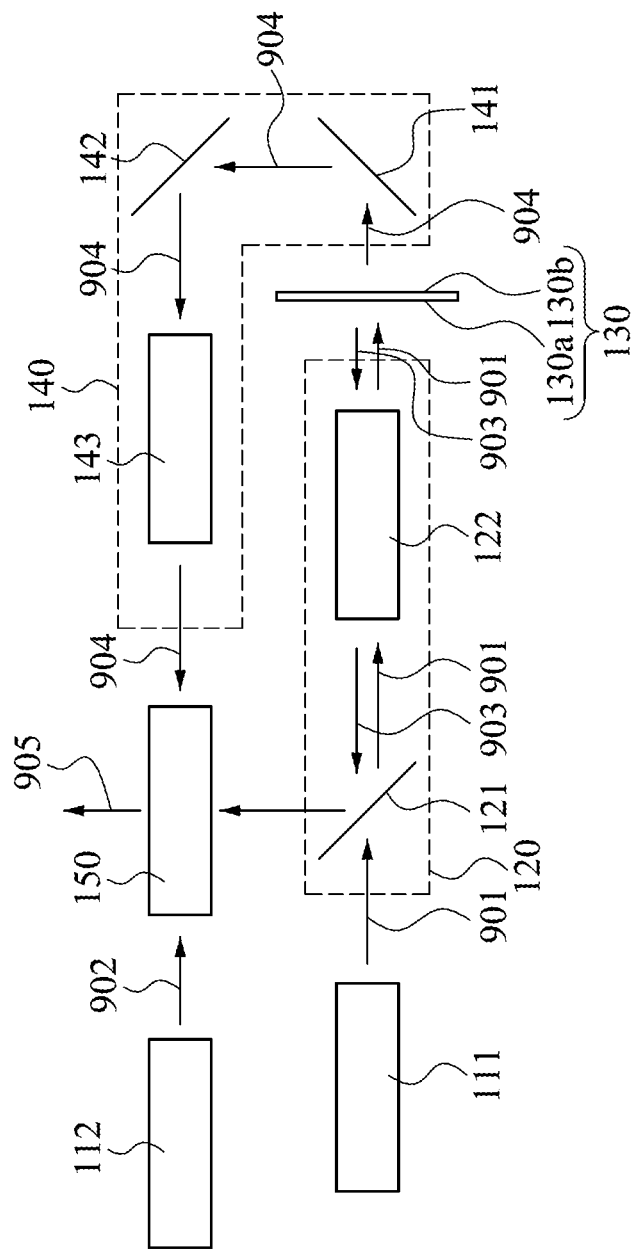
FIG. 20 to FIG. 23 are diagrams illustrating a laser light source for projector and corresponding optical paths according to different exemplary embodiments of the present disclosure.

FIG. 20 to FIG. 23 are diagrams illustrating the laser light source for projector 100 and the corresponding optical path according to different exemplary embodiments of the present disclosure. Since the details of the components of the laser light source for projector 100 have been described above, further descriptions are omitted here for the sake of brevity. As shown in FIG. 20, the laser light source for projector 100 further includes another laser light source module 112. The laser light source module 112 emits a blue laser light 902, wherein the laser light 902 enters the light combining module 150. In addition, the laser light 901 is absorbed by the phosphor layer of the phosphor wheel 130 when it passes through the phosphor wheel 130, thus the laser light 901 may not pass through the light receiving module 140, and the laser light 901 may not enter the light combining module 150, however, it is not a limitation. In other exemplary embodiments, the laser light 901 can pass through the phosphor wheel 130, so that the laser light 901 leaves the second side 130b and the enters the light receiving module 140, the light receiving module 140 changes the direction of the third optical axis of the laser light 901, and makes the laser light 901 enter the light combining module 150 after leaving the light receiving module 140.

Basically, the laser light 902 of the laser light source module 112 is used as a source of boost for light of a particular wavelength range, in order to give the laser light source for projector 100 a more complete color performance. For example, when the laser light 901 and the fluorescent lights 903, and 904 lack blue light element, the laser light 902 may be a blue light; when there is lack of red light element, the laser light 902 may be red. When boosting blue light, the laser light 902 can also enter the light receiving module 120 to fill in the light. For example, entering from the dichroic mirror 121 to fill in the light. It is noted that the aforementioned embodiments of the laser light 902 are merely illustrative, and are not limitations of the present disclosure. People with ordinary skills in this art can flexibly select the implementation manners of the laser light 902 according to the actual requirements.

Figure 21:
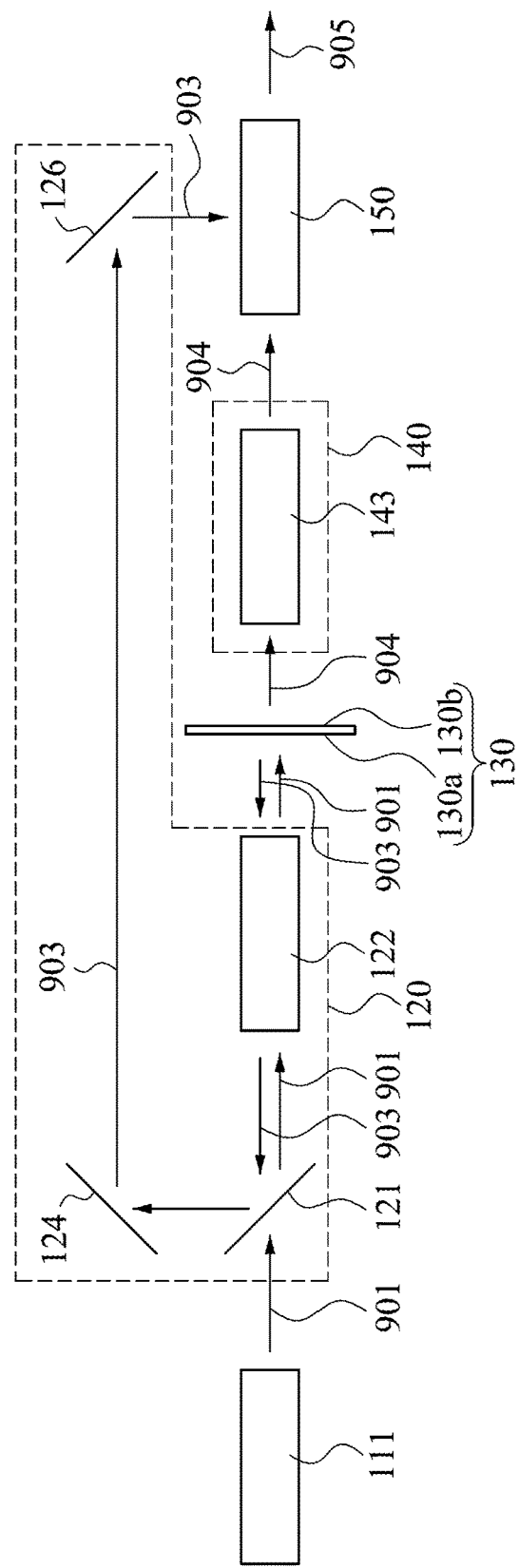

Moreover, for example, as shown in FIG. 21, the laser light source module 111 emits the laser light 901. The laser light 901 passes through the light receiving module 120. The phosphor wheel 130 has a first side 130a and a second side 130b. The phosphor wheel 130 receives the laser light 901, and converts the laser light 901 into the fluorescent light 903 and the fluorescent light 904, and emits from the first side 130a and the second side 130b, respectively. The fluorescent light 903 has a first optical axis, and the fluorescent light 903 can be converged by the converging module 122 in the light receiving module 120, and then be turned, for example, to be turned three times by the dichroic mirror 121, the reflecting mirrors 124 and 126, so that the light receiving module 120 changes the direction of the first optical axis after the fluorescent light 903 passes through the light receiving module 120. The light receiving module 140 has a converging module 143 for receiving and converging the fluorescent light 904. The light combining module 150 receives the fluorescent light 903 passing through the light receiving module 120 and the fluorescent light 904 passing through the light receiving module 140, and combines the fluorescent lights to form the combined light 905, wherein when the fluorescent lights 903 and 904 enter the light combining module 150, an angular difference between the first optical axis and the second optical axis is about 90°.

Figure 22:
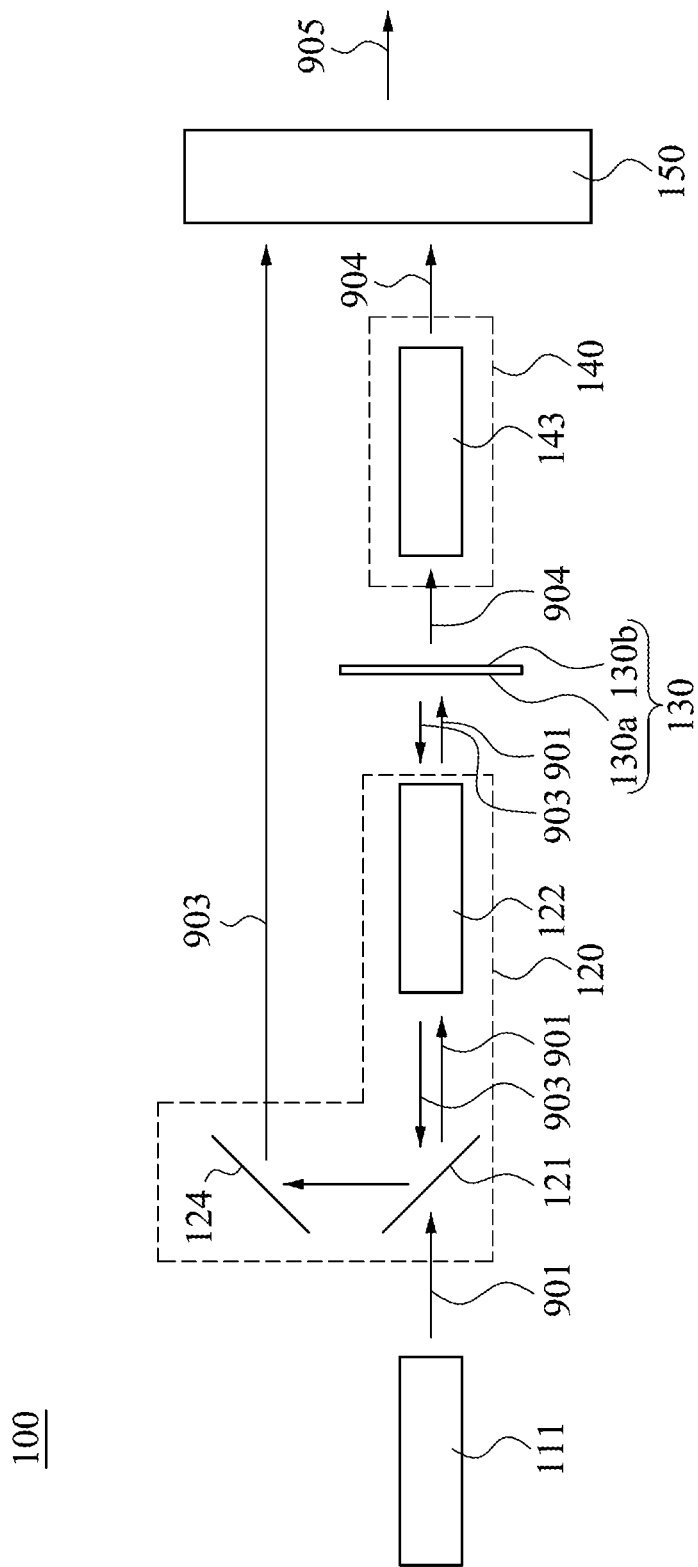

In some other exemplary embodiments, as shown in FIG. 22, the laser light source module 111 emits the laser light 901. The laser light 901 passes through the light receiving module 120. The phosphor wheel 130 has a first side 130a and a second side 130b. The phosphor wheel 130 receives the laser light 901, and converts the laser light 901 into the fluorescent light 903 and the fluorescent light 904, emits from the first side 130a and the second side 130b, respectively. The fluorescent light 903 has a first optical axis, and the fluorescent light 903 can be converged by the converging module 122 in the light receiving module 120, and then be refracted twice, for example, by the dichroic mirror 121 and the reflecting mirror 124, for making the light receiving module 120 change the direction of the first optical axis after the fluorescent light 903 passes through the light receiving module 120. The light receiving module 140 has a converging module 143 for receiving and converging the fluorescent light 904. The light combining module 150 receives the fluorescent light 903 passing through the light receiving module 120 and the fluorescent light 904 passing through the light receiving module 140, and combines the two fluorescent lights to form the combined light 905, wherein when the fluorescent lights 903 and 904 enter the light combining module 150, the first optical axis and the second optical axis are approximately parallel.

Figure 23:
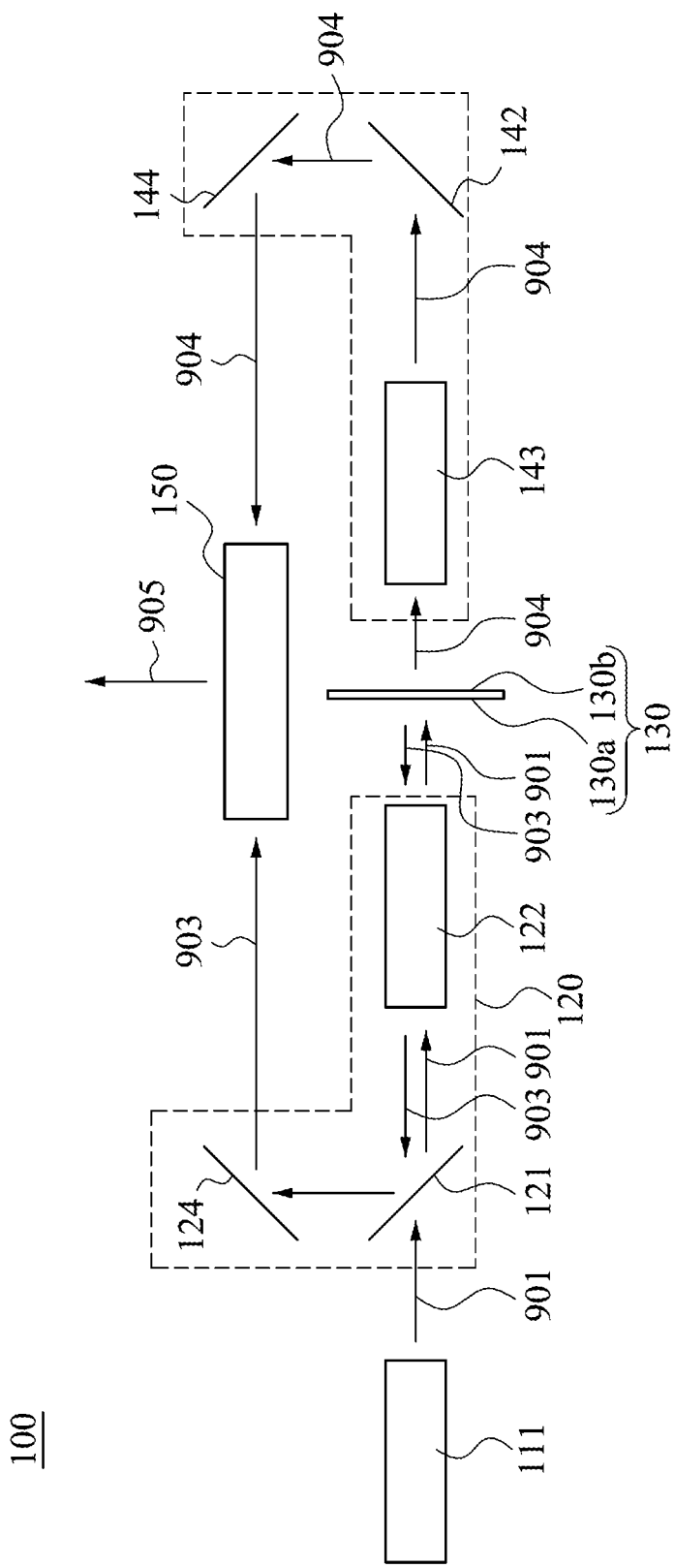

In some other exemplary embodiments, as shown in FIG. 23, the laser light source module 111 emits the laser light 901. The laser light 901 passes through the light receiving module 120. The phosphor wheel 130 has a first side 130a and a second side 130b. The phosphor wheel 130 receives the laser light 901, and converts the laser light 901 into the fluorescent light 903 and the fluorescent light 904 and emits the fluorescent light 903 and the fluorescent light 904 from the first side 130a and the second side 130b, respectively. The fluorescent light 903 has a first optical axis, and the fluorescent light 903 can be converged by the converging module 122 in the light receiving module 120, and then be turned, for example, be turned twice by the dichroic mirror 121 and the reflecting mirror 124, for making the light receiving module 120 change the direction of the first optical axis after the fluorescent light 903 passes through the light receiving module 120. The fluorescent light 904 has a second optical axis, the fluorescent light 904 can be converged by the converging module 143 in the light receiving module 140, and then be turned, for example, be turned twice by the reflecting mirrors 142 and 144, for making the light receiving module 140 change the direction of the second optical axis after the fluorescent light 904 passes through the light receiving module 140. The light combining module 150 receives the fluorescent light 903 passing through the light receiving module 120 and the fluorescent light 904 passing through the light receiving module 140, and combines the two fluorescent lights to form the combined light 905, wherein when the fluorescent lights 903 and 904 enter the light combining module 150, an angular difference between the first optical axis and the second optical axis is about 180°.

Figure 24:
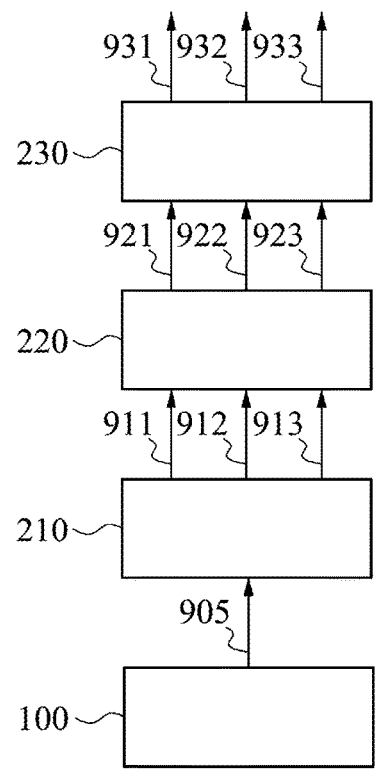
FIG. 24 and FIG. 25 are diagrams illustrating a laser projection device and corresponding optical paths according to different exemplary embodiments of the present disclosure.
Figure 25:
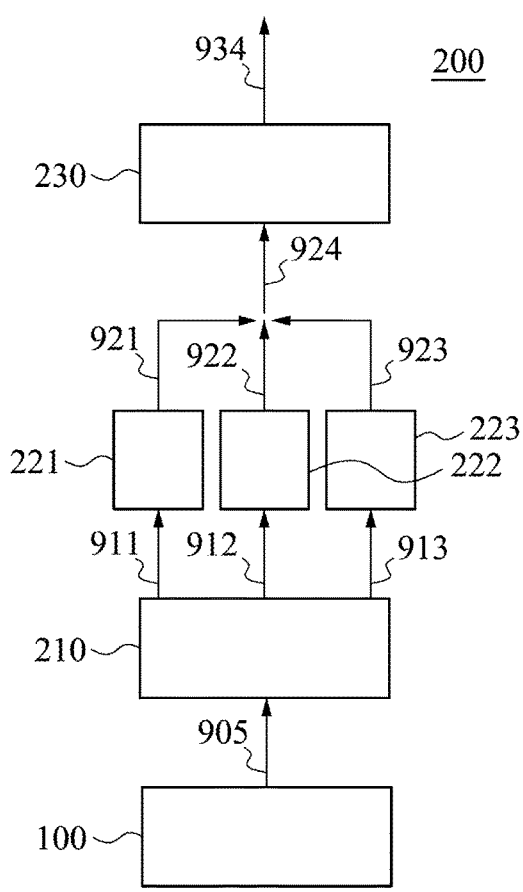

FIG. 24 and FIG. 25 are diagrams illustrating the laser projection device 200 and the corresponding optical paths according to different exemplary embodiments of the present disclosure. As shown in FIG. 24 and FIG. 25, the laser projection device 200 includes a laser light source for projector 100, a wavelength selector 210, at least an image module and a projection module 230. The wavelength selector 210 receives the combined light 905, and emits the first color light 911, the second color light 912 and the third color light 913. The image module receives a first color light 911, a second color light 912 and a third color light 913, and generates at least an image light. The projection module 230 receives the image light, and generates at least a projection light.

As shown in FIG. 1 and FIG. 24, the laser light source for projector 100 in FIG. 24 can be any of the aforementioned laser light source for projectors 100. The laser projection device 200 includes an image module 220, and an amount of the image module 220 is one, and the wavelength selector 210 emits the first color light 911, the second color light 912 and the third color light 913 at different timings, the image module 220 receives the first color light 911, the second color light 912 and the third color light 913 at different timings. After the image module 220 receives the first color light 911, the image module 220 generates the image light 921. After the image module 220 receives the second color light 912, the image module 220 generates the image light 922. After the image module 220 receives the third color light 913, the image module 220 generates the image light 923. That is, the image module 220 generates the image lights 921, 922 and 923 at different timings. The projection module 230 receives the image light 921, 922 and 923 at different timings. After the projection module 230 receives the image light 921, the projection module 230 generates the projection light 931. After the projection module 230 receives the image light 922, the projection module 230 generates the projection light 932. After the projection module 230 receives the image light 923, the projection module 230 generates the projection light 933. That is, the projection module 230 generates the projection lights 931, 932 and 933 at different timings.

For example, the wavelength selector 210 can be a color wheel with a filter. The rotation manner of the color wheel may correspond to that of the phosphor wheel 130. For instance, in some exemplary embodiments, when the phosphor wheel 130 rotates and makes the phosphor wheel 130 emit the fluorescent lights 903 and 904, and, assuming that the laser light 901 may be totally converted by the phosphor layer of the phosphor wheel 130, and the color wheel may rotate to the corresponding filter for selecting and holding the specific spectrum range (e.g., red light or green light) in the spectrums of the fluorescent lights 903 and 904. When the phosphor wheel 130 rotates to make the laser light 901 pass through the phosphor wheel 130 (at this time the phosphor wheel 130 does not emit the fluorescent light 904), the color wheel may rotate to the corresponding filter or diffuser, and make it select and emit a specific spectrum range (e.g., blue light) in the spectrum of the laser light 901.

For example, the image module 220 can be a Liquid Crystal Display Panel (LCD panel) or a Digital Micromirror Device (DMD). It is to be understood that the aforementioned embodiments of the image module 220 are merely illustrative and are not intended to limit the present disclosure. People with ordinary skills in this art can selectively choose the implementation method of the image module 220 depending on the actual requirements.

For example, the projection module 230 can includes a plurality of lenses, for instance, converging mirrors or divergent lenses. It is to be understood that the aforementioned embodiments of the projection module 230 are merely illustrative and are not intended to limit the present disclosure. People with ordinary skills in this art can selectively choose the implementation method of the projection module 230 depending on the actual requirements.

For example, the first color light 911, the second color light 912 and the third color light 913 generated corresponding to the rotation of the color wheel can be red, green, or blue, respectively, and, each of the color lights forms the image lights 921, 922, and 923, respectively, by the image module 220 at different timings, are a red image light, a green image light or a blue image light. The projection lights 931, 932 and 933 can be a red projection light, a green projection light, or a blue projection light, respectively. It is to be understood that the aforementioned embodiments of the first color light 911, the second color light 912, the third color light 913, the image lights 921, 922 and 923, and the projection lights 931, 932 and 933 are merely illustrative and are not intended to limit the present disclosure. People with ordinary skills in this art can selectively choose the implementation methods of the first color light 911, the second color light 912, the third color light 913, the image lights 921, 922 and 923, and the projection lights 931, 932 and 933 depending on the actual requirements.

As shown in FIG. 20 and FIG. 25; the laser projection device 200 in FIG. 25 is approximately the same as the laser projection device 200 in FIG. 24; the mainly difference may be described in the following.

The laser light source for projector 100 in FIG. 25 can be any of the aforementioned laser light source for projectors 100. The laser projection device 200 includes image modules 221, 222, and 223. The image module 221 receives the first color light 911 and generates the image light 921, the image module 222 receives the second color light 912 and generates the image light 922, and, the image module 223 receives the third color light 913 and generates the image light 923. The image lights 921, 922 and 923 are combined and form the image light 924. The projection module 230 receives the image light 924 and generates the projection light 934.

For example, the wavelength selector 210 can includes a plurality of dichroic mirrors or a plurality of lenses. More particularly, the spectrum of the combined light 905 is essentially white, including the spectrum of the first color light 911, the spectrum of the second color light 912, and the spectrum of the third color light 913, and, after receiving the combined light 905, the wavelength selector 210 simultaneously separates the first color light 911, the second color light 912 and the third color light 913.

For example, the image modules 221, 222, and 223 can be LCD panels or DMDs. It is to be understood that the aforementioned embodiments of the image modules 221, 222, and 223 are merely illustrative and are not intended to limit the present disclosure. People with ordinary skills in this art can selectively choose the implementation method of the image modules 221, 222, and 223 depending on the actual requirements.

For example, the laser light source for projector 100 can adjust the directions of the optical axes of the image lights 921, 922 and 923 by a plurality of reflecting mirrors, so that the image lights 921, 922 and 923 can be combined to form the image light 924.

The present disclosure uses the phosphor wheel of the laser light source for projector to omit the design of the reflective layer, so that the fluorescent lights may be emitted from two opposite sides of the phosphor wheel. Therefore, since there is no reflective layer, the situation that the reflective layer absorb a portion of the fluorescent light may not happen, so that the light combining module can receive more fluorescent light, making the brightness of the combined light emitted from the laser light source for projector be greatly promoted.

Furthermore, after the fluorescent light emits from the phosphor powder to the surroundings, the fluorescent light may be absorbed by other phosphor powders, resulting in self-absorption of the fluorescent light, so that the light extracting rate (e.g. the light output ratio) of the phosphor wheel decreases. Since the phosphor wheel of the laser light source for projector omits the usage of the reflective layer, after the fluorescent light reaches the first side or the second side of the phosphor wheel, the fluorescent light may directly leave the phosphor layer. Thus, the average path length of the fluorescent light in the phosphor layer may be shorter, making the phosphor layer with less self-absorption of the fluorescent light, so that effectively promoting luminous efficiency of the phosphor layer.

By the aforementioned two mechanisms, the brightness of the combined light emitted by the laser light source for projector can be greatly enhanced. In some exemplary embodiments, comparing to conventional laser light source for projector, the brightness of the combined light emitted by the laser light source for projector of the present disclosure can be enhanced about 20% to 30%.

What is claimed is:

1. A laser light source for projector, comprising:
    at least one first laser light source module, for emitting a first laser light;
    a first light receiving module, wherein the first laser light passes through the first light receiving module;
    a phosphor wheel, having a first side and a second side, for receiving the first laser light and converting the first laser light into a first fluorescent light and a second fluorescent light, wherein the first side receives the first laser light passing through the first light receiving module and emits the first fluorescent light, and the second side emits the second fluorescent light;
    a second light receiving module, for receiving the second fluorescent light, wherein after the first fluorescent light passes through the first light receiving module and the second fluorescent light passes through the second light receiving module, at least one of the directions of optical axes of the first fluorescent light and the second fluorescent light is changed, wherein a total number of times by which the directions of the optical axes of the first fluorescent light and the second fluorescent light changes is at least twice;
    a light combining module, for receiving the first fluorescent light passing through the first light receiving module and the second fluorescent light passing through the second light receiving module and combines the first and the second fluorescent lights to form a combined light; and
    a second light source module directly emitting a second laser light into the light combining module.

2. The laser light source for projector of claim 1, wherein the first laser light is blue light.

3. The laser light source for projector of claim 1, wherein the first fluorescent light and the second fluorescent light have the same spectrum.

4. The laser light source for projector of claim 1, wherein a brightness difference between the first fluorescent light and the second fluorescent light is less than 5%.

5. The laser light source for projector of claim 1, wherein the first fluorescent light and the second fluorescent light are red lights, green lights, yellow lights, or combinations thereof.

6. The laser light source for projector of claim 1, wherein the first light receiving module comprises:
    at least one dichroic mirror, for making the first laser light pass through the dichroic mirror and reflecting the first fluorescent light.

7. The laser light source for projector of claim 1, wherein the first light receiving module comprises:
    a converging module, for converging the first fluorescent light.

8. The laser light source for projector of claim 1, wherein the second light receiving module comprises:
    at least a reflecting mirror, for reflecting the second fluorescent light.

9. The laser light source for projector of claim 1, wherein the second light receiving module comprises:
    a converging module, for converging the second fluorescent light.

10. The laser light source for projector of claim 1, wherein the light combining module comprises:
    an integration rod, having an opening, for emitting the combined light; and
    an optical path adjusting module, for making the direction of the optic axis of the first fluorescent light the same as that of the optic axis of the second fluorescent light after the first fluorescent light and the second fluorescent light pass through the optical path adjusting module, and making the first fluorescent light and the second fluorescent light enter the opening.

11. The laser light source for projector of claim 1, wherein the first laser light passes through the phosphor wheel, first laser light leaves the second side and enters the second light receiving module, the second light receiving module is used for changing the direction of the optic axis of the first laser light, and the first laser light enters the light combining module after leaving the second light receiving module.

12. The laser light source for projector of claim 1, wherein the phosphor wheel comprises at least a first phosphor layer, the first phosphor layer is used for converting the first laser light into the first fluorescent light and the second fluorescent light.

13. The laser light source for projector of claim 12, wherein the phosphor wheel further comprises at least a transparent substrate, and the first phosphor layer is disposed on the transparent substrate.

14. The laser light source for projector of claim 12, wherein the phosphor wheel further has at least a first portion, and the first phosphor layer is disposed in the first portion.

15. The laser light source for projector of claim 14, wherein the phosphor wheel further comprises at least a second portion, the second portion is transparent, and the first portion and the second portion are used for receiving the first laser light at different timings.

16. The laser light source for projector of claim 14, wherein the phosphor wheel further comprises a third portion, the phosphor wheel further comprises at least a second phosphor layer, the second phosphor layer is disposed in the third portion, wherein the first portion and the third portion are used for receiving the first laser light at different timings, and the first phosphor layer and the second phosphor layer are used for converting the first laser light at different timings, for making the lights emitted from the first phosphor layer and the second phosphor layer be combined to form the first fluorescent light and the second fluorescent light.

17. A laser projection device, comprising:
    the laser light source for projector of claim 1;

a wavelength selector, for receiving the combined light, and emitting a first color light, a second color light, and a third color light;

at least one image module, for receiving the first color light, the second color light and the third color light, and generating at least an image light; and a projection module, for receiving the image light, and generating at least a projection light.

18. The laser projection device of claim 17, wherein an amount of the at least one image module is three, and the image modules respectively receives the first color light, the second color light and the third color light for generating a first color image light, a second color image light and a third color image light correspondingly, and the first color image light, the second color image light and the third color image light are combined to form the image light.

19. The laser projection device of claim 17, wherein an amount of the at least one image module is one, and the wavelength selector emits the first color light, the second color light and the third color light at different timings, the image module receives the first color light, the second color light and the third color light at different timings, and generates the image lights at different timings, the projection module receives the image lights at different timings, and generates the projection lights at different timings.

* * * * *